United States Patent [19]

Agee

[11] Patent Number: 4,711,594

[45] Date of Patent: Dec. 8, 1987

[54] TOOL HANDLE AND HEAD ASSEMBLY

[76] Inventor: Jerry W. Agee, Rte. 1, Box 362, Paragould, Ark. 72450

[21] Appl. No.: 17,455

[22] Filed: Feb. 24, 1987

[51] Int. Cl.$^4$ .............................................. B25G 3/00
[52] U.S. Cl. ................................... 403/263; 403/258; 403/334
[58] Field of Search ............... 403/254, 258, 260, 263, 403/248, 250, 333, 334, 373, 374

[56] References Cited

U.S. PATENT DOCUMENTS

| 521,861 | 6/1894 | Zeiser | 403/248 |
| 1,339,638 | 5/1920 | Velchansky et al. | 403/248 |
| 1,342,929 | 6/1920 | Shepard | 403/248 |
| 1,943,807 | 1/1934 | Bellerive | 403/248 |
| 2,432,813 | 12/1947 | Scheide | 403/254 |
| 3,704,734 | 12/1972 | Soto | 403/258 |

FOREIGN PATENT DOCUMENTS 7896 2/1980 European Pat. Off. ............ 403/374

Primary Examiner—Andrew V. Kundrat
Attorney, Agent, or Firm—Norman B. Rainer

[57] ABSTRACT

An improved manually operated striking tool such as a pick, axe, hammer, sledge, or maul is made from a metal handle and an interactive metal plug which are caused to grip a working head by means of a steel bolt that passes through the plug and threadably engages the handle. The plug has a tapered sidewall and the handle has a tapered zone adjacent its extremity that engages the working head. The working head has a doubly tapered channel that seats the plug and handle in opposed, axially aligned relationship.

2 Claims, 2 Drawing Figures

TOOL HANDLE AND HEAD ASSEMBLY

BACKGROUND OF THE INVENTION

This invention relates to manually operated tools such as picks, axes, hammers, sledges and mauls generically comprised of an elongated handle which holds at one extremity a working head, and more particularly concerns means which cause the working head to be securely held to the handle.

Picks, axes, mauls and other similar manually operated impact tools are generally comprised of a wooden handle having a distal end which is inserted into a receiving channel in the working head and secured thereto by a wedge driven into the distal end of the handle from the opposite side of the receiving channel. The wedge serves to expand the portion of the handle within the receiving channel, forcing the handle into strong frictional engagement with the interior surfaces of the receiving channel. This construction, although time-honored and inexpensive, has the disadvantage that the wood of the handle dries up with attendant shrinking and loosening within the receiving channel. Also, such principle of attachment requires the preliminary step of seating the working head upon the distal end of the handle so that its axial location upon the handle is accurately achieved.

Attachment means which utilize threaded bolts that enter the receiving channel and fasten the working head to the handle are disclosed in U.S. Pat. No. 1,943,807 to Bellerine, U.S. Pat. No. 1,342,929 to Shepard, and U.S. Pat. No. 521,861 to Zeiser et al. The effect of the threaded bolt is generally to transmit an adjustable wedge-like force to the interior of the distal end of the handle, causing expansion thereof with attendant increased frictional engagement with the receiving channel. Although some earlier attachment means involve a positive abutment principle instead of frictional engagement for retaining the working head in its properly seated position, they are generally of a complex construction amenable to failure during prolonged rugged use, or involve a difficult assembly technique.

It is accordingly an object of the present invention to provide a manually operated tool comprised of an elongated handle and a working head securely affixed to one extremity of said handle.

It is another object of this invention to provide a tool as in the foregoing object wherein the means for affixing the working head to the handle involves a machine bolt.

It is a further object of the present invention to provide a tool of the aforesaid nature wherein said bolt carries positive abutment means which controls the axial position of the working head upon said handle.

It is still another object of this invention to provide a tool of the aforesaid nature which is of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a tool assembly comprising:

(a) an elongated metal handle having a substantially straight center axis, a generally cylindrical surface, distal and proximal extremities, a conically tapered zone associated with said distal extremity and convergent onto a flat terminal face perpendicularly disposed to said axis, and a threaded axially aligned recess which opens upon said terminal face, (b) a working head seated upon said distal extremity, said working head having a centered channel comprised of first and second conically tapered surfaces outwardly divergent from a site of confluence within said channel, said first tapered surface being configured to accommodate the tapered zone of said handle, (c) a metal plug having parallel flat upper and lower faces and a conically tapered sidewall inwardly convergent at said lower face, and having an axial bore, said plug being in tight fitting engagement with said second conically tapered surface whereby said lower face is directed toward the terminal face of said handle, and (d) a steel machine bolt which passes thorugh the bore of said plug and threadably engages the recess of said handle, said bolt having a head that rests against the upper face of said plug, whereby tightening of said bolt draws both the handle and plug toward the interior of the channel of said working head.

In preferred embodiments, the handle and plug are fabricated of aluminum, and the bolt is provided with a hexagonal head.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
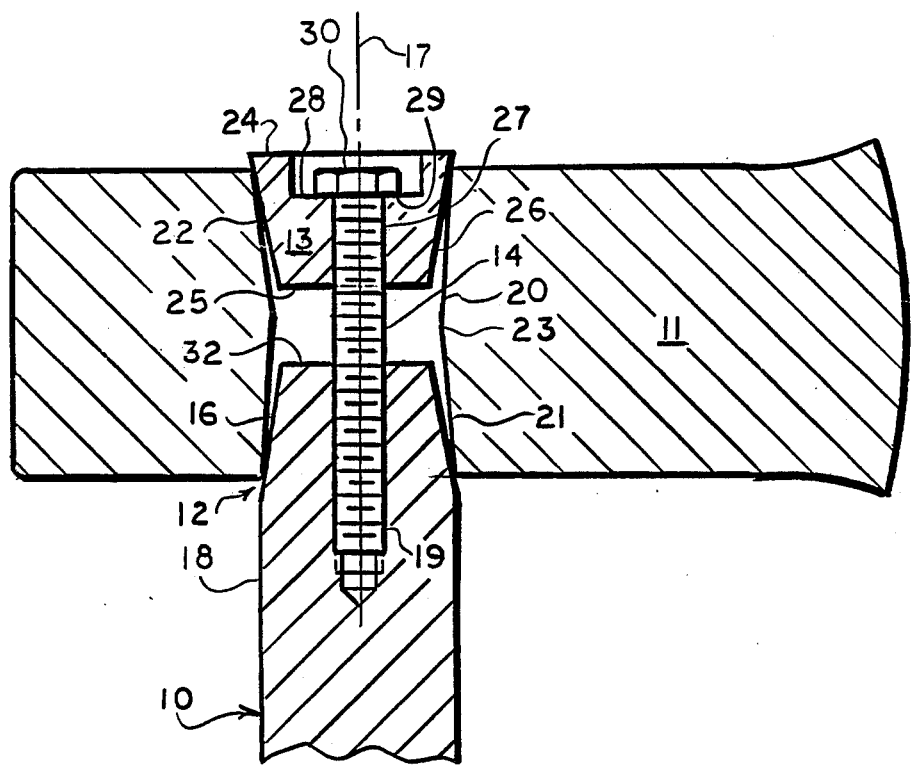
FIG. 1 is a sectional side view of an embodiment of the tool assembly of the present invention.
Figure 2:
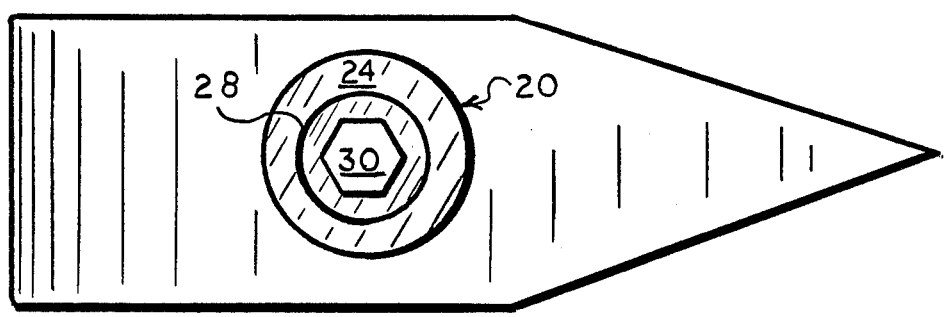
FIG. 2 is a top view of the tool assembly of FIG. 1.

Referring to the drawing, an embodiment of the tool assembly of this invention is shown comprised of handle 10, working head 11 disposed upon the distal extremity 12 of the handle, plug 13, and machine bolt 14 which interengages said plug and handle.

The exemplified embodiment of handle 10 is a length of cylindrical aluminum rod stock having a diameter of 1¼ inches and a length of 3 feet. Associated with the distal extremity is a conically tapered zone 16 which converges toward the axis 17 of the handle and onto flat terminal face 32 perpendicularly disposed to said axis. The angle of the taper, measured with respect to the cylindrical surface 18 of the handle, is in the range of 2 to 10 degrees. A threaded recess 19 is centered upon axis 17, and opens upon said distal extremity.

Working head 11, exemplified as a maul of monolithic iron construction, has a centered channel 20 comprised of first and second conically tapered surfaces 21 and 22, respectively, outwardly divergent from a site of confluence 23 mid-length of the channel. Said first tapered surface is configured to accommodate the tapered zone 16 of the handle and in fact enables the working head to be seated upon the distal extremity of the handle.

Plug 13, preferably of aluminum, has parallel flat upper and lower faces 24 and 25, respectively, each having a circular perimeter centered upon axis 17. A conically tapered sidewall 26 extends between said faces, converging upon said lower face 25. The angle of convergence of said sidewall is between 2 and 10 degrees and is adapted to make tight-fitting insertive engagement with second tapered surface 22 of channel 20 in a manner whereby lower face 25 is directed toward handle 10. The plug is provided with an axially disposed cylindrical bore 27 which may open upon shoulder 28 countersunk from upper face 24.

The steel machine bolt 14 extends through bore 27 so that the flat underside 29 of hexagonal head 30 rests upon upper face 24 or rests upon shoulder 28. Bolt 14 threadably engages recess 19 in the distal extremity of the handle. Upon tightening of the bolt, the handle and plug are drawn toward the site of confluence 23 within channel 20. The plug functions as an abutment means which not only retains the working head, but controls its axial position upon the handle. In the tightened, fully assembled state, terminal face 32 and lower face 25 of the plug will be in parallel juxtaposition, and the distance of separation between them will be between about 0.03 and 0.13 inch.

In certain embodiments, the taper angle of the plug and handle may be about 1 degree greater than the taper angles of the first and second conically tapered surfaces. Such configuration permits a tapered annular gap to exist between the handle and working head. This gap, in association with the aforesaid separation between the terminal face and the plug has been found to minimize the transmission of vibration from the working head to the handle. In some embodiments, a shock absorbing resilient material may be disposed within said annular gap.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A tool assembly comprising:
   (a) an elongated metal handle having a substantially straight center axis, a generally cylindrical surface, distal and proximal extremities, a conically tapered zone associated with said distal extremity and convergent onto a flat terminal face perpendicularly disposed to said axis, and a threaded axially aligned recess which opens upon said terminal face,
   (b) a working head seated upon said distal extremity, said working head having a centered channel comprised of first and second conically tapered surfaces outwardly divergent from a site of confluence within said channel, said first tapered surface being configured to accommodate the tapered zone of said handle,
   (c) a metal plug having parallel flat upper and lower faces and a conically tapered sidewall inwardly convergent at said lower face, and having an axial bore, said plug being in tight fitting engagement within said second conically tapered surface whereby said lower face is directed toward the terminal face of said handle, and
   (d) a steel machine bolt which passes through the bore of said plug and threadably engages the recess of said handle, said bolt having a head that rests against the upper face of said plug, whereby tightening of said bolt draws both the handle and plug toward said site of confluence within the channel of said working head,
   (e) the angles of the tapers of the tapered zone of the handle and sidewall of the plug being between about 2 and 10 degrees, and
   (f) the angles of the tapers of the tapered zone of the handle and sidewall of the plug being about 1 degree greater than the taper angles of the first and second conically tapered surfaces of the channel, thereby causing a tapered annular gap to exist between the handle and working head.

2. The tool assembly of claim 1 wherein a resilient material is contained within said annular gap.

* * * * *